United States Patent
Hoelscher

(12) 
(10) Patent No.: US 8,418,371 B2
(45) Date of Patent: Apr. 16, 2013

(54) RETROFITTING GRASS TRIMMING APPARATUS WITH SPINNING SUPPORT GUIDE

(76) Inventor: Gene Hoelscher, Fort Mill, SC (US)

( * ) Notice: Subject to any disclaimer, the term of this patent is extended or adjusted under 35 U.S.C. 154(b) by 0 days.

(21) Appl. No.: 13/277,849

(22) Filed: Oct. 20, 2011

(65) Prior Publication Data

US 2012/0159792 A1 Jun. 28, 2012

Related U.S. Application Data

(60) Provisional application No. 61/426,066, filed on Dec. 22, 2010, provisional application No. 61/489,248, filed on May 23, 2011.

(51) Int. Cl.
*A01D 34/90* (2006.01)
*A01D 34/416* (2006.01)

(52) U.S. Cl.
USPC .................................. 30/276; 30/347; 56/12.7

(58) Field of Classification Search .................... 30/276, 30/347, 263; 56/12.7, 295
See application file for complete search history.

(56) References Cited

U.S. PATENT DOCUMENTS

| | | | |
|---|---|---|---|
| 4,107,841 A | 8/1978 | Rebhun | |
| 4,135,700 A | 1/1979 | Arzoian | |
| 4,148,141 A | 4/1979 | Hoff | |
| 4,512,143 A | 4/1985 | Jimenez | |
| 4,584,771 A * | 4/1986 | Tillotson | 30/276 |
| 4,587,800 A | 5/1986 | Jimenez | |
| 4,685,279 A | 8/1987 | Gullett | |
| 4,845,929 A | 7/1989 | Kawasaki et al. | |
| 5,048,187 A | 9/1991 | Ryan | |
| 5,095,687 A | 3/1992 | Andrew et al. | |
| 5,279,102 A | 1/1994 | Foster | |
| 5,313,770 A * | 5/1994 | Smothers | 56/12.7 |
| 5,317,807 A | 6/1994 | Pulley | |
| 5,459,985 A | 10/1995 | Gedert | |
| 5,477,665 A | 12/1995 | Stout | |
| 5,524,349 A | 6/1996 | Dolin | |
| 5,615,541 A | 4/1997 | Ota | |
| 5,626,006 A | 5/1997 | Fricke, Sr. | |
| 5,813,122 A * | 9/1998 | Mubareka | 30/276 |
| 5,836,142 A | 11/1998 | Maxwell | |
| 5,836,227 A | 11/1998 | Dees, Jr. et al. | |
| 5,839,262 A | 11/1998 | Sorensen | |
| 5,906,051 A * | 5/1999 | Nannen | 30/276 |
| 5,970,692 A | 10/1999 | Foster | |
| 5,987,756 A | 11/1999 | Yates et al. | |

(Continued)

OTHER PUBLICATIONS

Information Disclosure Statement (IDS) Letter Regarding Common Patent Application(s), dated Mar. 5, 2012.

*Primary Examiner* — Phong Nguyen
(74) *Attorney, Agent, or Firm* — Tillman Wright, PLLC; Chad D. Tillman; Daniel Q. Wybenga

(57) ABSTRACT

A kit for retrofitting a grass trimming apparatus with a spinning support guide includes a base mount disc, a semispherical base, a guide fastener having a head with a hexagonal opening, one or more spacer discs, one or more disc fasteners, and a hex key. Furthermore, the base mount disc is adapted to affix to the semispherical base with the one or more disc fasteners and define a chamber for partially housing the guide fastener therein, and the hex key is adapted to rotate the guide fastener to threadably attach to a threaded receptacle on an underside of the grass trimming apparatus.

20 Claims, 16 Drawing Sheets

U.S. PATENT DOCUMENTS

| | | |
|---|---|---|
| 6,327,782 B1 | 12/2001 | Blevins |
| 6,604,349 B2 | 8/2003 | Deal |
| 6,655,034 B2 | 12/2003 | Richardson et al. |
| 6,675,565 B2 | 1/2004 | Appleyard |
| 6,722,040 B2 | 4/2004 | Sullivan |
| 6,745,549 B1 | 6/2004 | Taylor |
| 6,757,980 B2 | 7/2004 | Arsenault |
| 6,971,223 B2 * | 12/2005 | Scott et al. .................. 56/12.7 |
| 7,093,366 B2 | 8/2006 | Black |
| 7,107,745 B2 | 9/2006 | Dunda |
| 2002/0073556 A1 * | 6/2002 | Fogle .......................... 30/276 |
| 2003/0005674 A1 | 1/2003 | Powell |
| 2005/0044835 A1 | 3/2005 | Hishida |

\* cited by examiner

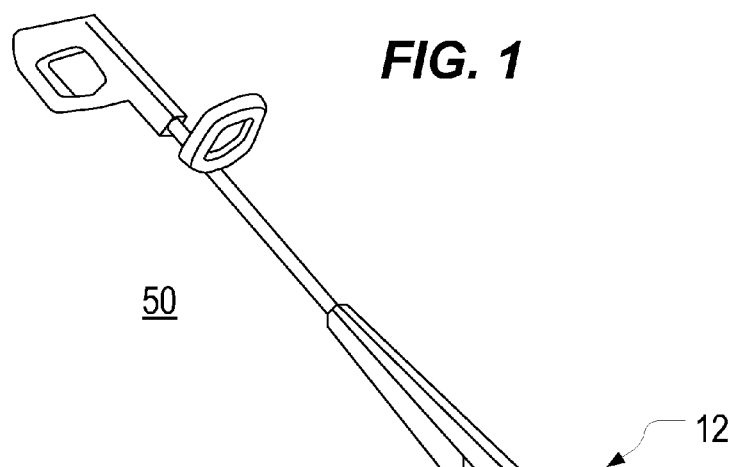
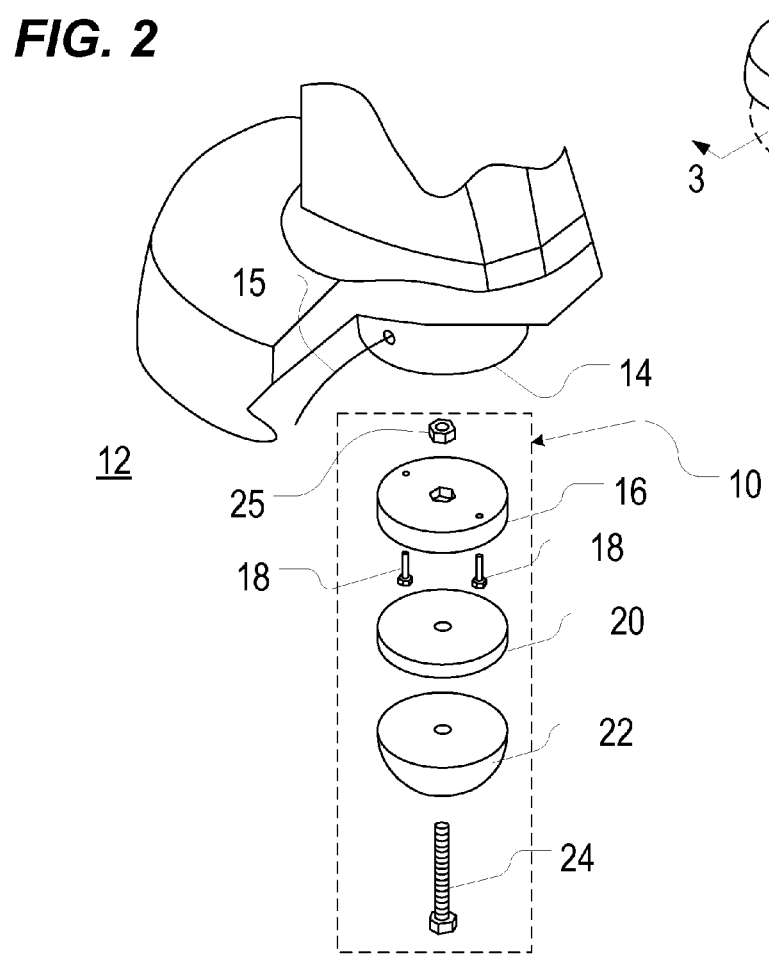

RETROFITTING GRASS TRIMMING APPARATUS WITH SPINNING SUPPORT GUIDE

CROSS-REFERENCE TO RELATED APPLICATION

The present application is a U.S. nonprovisional patent application of, and claims priority under 35 U.S.C. §119(e) to, the following: (1) U.S. provisional patent application Ser. No. 61/426,066, filed Dec. 22, 2010, which '066 application is incorporated by reference herein, and a copy of which is attached hereto as Appendix A and incorporated herein by reference, and (2) U.S. provisional patent application Ser. No. 61/489,248, filed May 23, 2011, which '248 application is incorporated by reference herein, and a copy of which is attached hereto as Appendix B and incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to trimming devices. More specifically, the present invention relates to grass trimming devices such as edgers and weed eaters. Generally, such devices are required to be carried and supported by a user while in use. A number of attachable support devices exist.

For example, U.S. Patent Application Publication No. 2003/0005674 A1 to Powell discloses a support assembly guide for a weed and grass trimmer comprising a disc joined to a bowed support shaft clamped to the trimmer's shaft. The bowed support member extends around a shield to position the disc below the rotating head of the trimmer.

A number of patents disclose wheeled support members, including U.S. Pat. No. 7,107,745 to Dunda, in which the wheeled assembly attaches to a weed trimmer shaft and extends in front of the trimmer Another—U.S. Pat. No. 6,745,549 to Taylor—also discloses a wheeled support member that attaches to a trimmer shaft.

Even in view of these references, it is believed that a need exists for improvement in grass trimming devices. This, and other needs, are addressed by one or more aspects of the present invention.

SUMMARY OF THE INVENTION

The present invention includes many aspects and features. Moreover, while many aspects and features relate to, and are described in, the context of a spinning support guide for a trimming device, the present invention is not limited to use only in trimming devices, as will become apparent from the following summaries and detailed descriptions of aspects, features, and one or more embodiments of the present invention.

Accordingly, broadly defined, one aspect of the present invention related to a motorized trimming apparatus. An exemplary such apparatus includes a trimmer head assembly having a spinning support guide, a motor, and a shaft. Furthermore, the trimmer head assembly is disposed at a first end of the shaft and the motor is disposed proximate a second end of the shaft.

In a feature of this aspect of the present invention, the spinning support guide is affixed to a lower end of the trimmer head assembly.

In another feature, the spinning support guide is affixed to a rotatable portion of the trimmer head assembly.

In yet another feature, the spinning support guide comprises a base mount disc and a base. In a variation of this feature, the base mount disc is permanently affixed to a lower end of the trimmer head assembly. In another variation, the base mount disc is detachable from the lower end of the trimmer head assembly. In still another variation, the spinning support guide further comprises one or more spacer discs disposed between the base mount disc and the base.

In another variation, the base mount disc includes a first aperture leading to an embedded threaded receptacle, the base includes a second aperture therethrough, and a threaded bottom fastener is adapted to penetrate both the second aperture and the first aperture and threadably fasten to the embedded threaded receptacle.

In still another variation, the apparatus further includes one or more spacer discs, each spacer disc including a central aperture therethrough adapted to accept the threaded bottom fastener, wherein each spacer disc is disposed between the base mount disc and the base and held in place by the threaded bottom fastener.

Another aspect of the present invention relates to a spinning support guide for a trimmer head assembly as substantially shown and described. An exemplary such apparatus includes a base mount disc having a base mount disc secured to a lower end of the trimmer head assembly, a base removably attached to the base mount disc via a bottom fastener, and one or more spacer discs disposed between the base mount disc and the base.

In a feature of this aspect of the invention, the base mount disc comprises an embedded threaded receptacle adapted to threadably receive and secure the bottom fastener. In a variation of this feature, the embedded threaded receptacle is a recessed nut. In a further variation, each of the base and the one or more spacer discs includes a centrally disposed aperture therethrough, the apertures defining an opening aligned with the embedded threaded receptacle and adapted to receive the bottom fastener.

In another feature of this aspect of the invention, the base is a semispherical base.

In yet another feature, the one or more spacer discs includes a first spacer disc with a first thickness and a second spacer disc with a second thickness. In a variation of this feature, the first thickness is different from the second thickness.

In still another feature, the base mount disc is secured to the lower end of the trimmer head assembly by one or more flush mount machine screws.

In a further feature, the bottom fastener is a machine screw.

In still another feature, one or more spacer discs and the base are constructed from plastic material.

In yet another feature, the one or more spacer discs and the base each have a diameter of approximately two and one-half inches (2½").

In still another feature, each the one or more spacer discs has a thickness between three-eighths inch (⅜") and one and five-eighths inches (1⅝").

Another aspect of the present invention relates to a spinning support guide for a trimmer head assembly. An exemplary such spinning support guide includes a base mount disc, having an embedded threaded receptacle, the base mount disc being secured to the lower end of the trimmer head assembly by one or more flush mount machine screws; one or more spacer discs, each including a central aperture, each of the one or more spacer discs being disposed between the base mount disc and the base; a semispherical base, having a central aperture; and a bottom fastener. Furthermore, the bottom fastener is adapted to penetrate the central aperture of the base and the central apertures of the one or more spacer discs and threadingly attach to the embedded threaded receptacle so as to secure the base and the one or more spacer discs to the base mount disc.

Another aspect of the present invention relates to a method of using a grass trimming apparatus. An exemplary such method includes the steps of providing a grass trimming apparatus, including a trimmer head assembly having a spinning support guide at a bottom portion thereof, and a cutting mechanism positioned above the spinning support guide; holding the grass trimming apparatus in an operable position; placing the spinning support guide on a trimmable surface, whereby the spinning support guide provides a point of contact between the grass trimming apparatus and the trimmable surface; activating the cutting mechanism; trimming the cutting surface to a desired height; and moving the grass trimming apparatus along the trimmable surface while maintaining the point of contact.

In a feature of this aspect of the invention, the grass trimming apparatus further includes a shaft and a motor; wherein the motor is disposed proximate a first end of the shaft and the trimmer head assembly is disposed proximate a second end of the shaft; and wherein the motor propels the cutting mechanism. In a variation of this feature, the shaft includes a handle portion adapted for holding the grass trimming apparatus in an operable position.

In another feature of this aspect of the invention, the method further includes the step of adjusting the desired height by altering the spinning support guide. In a variation of this feature, altering the spinning support guide includes the steps of: detaching a base portion of the spinning support guide; adding one or more spacer discs to the spinning support guide; and reattaching the base portion of the spinning support guide. In a further variation each of the one or more spacer discs has a thickness of between three-eighths inch (3/8") and one and five-eighths inches (1 5/8").

In yet another feature, the support mechanism is semispherical.

In still another feature, the support mechanism includes a mounting portion and a semispherical base.

In a further feature, the trimmable surface includes grass.

In an additional feature, the trimmable surface includes weeds.

In still another feature, the trimmable surface includes shrubbery.

In another feature, the trimmable surface includes non-organic material.

Another aspect of the present invention relates to a method of using a grass trimming apparatus. An exemplary such method includes the steps of providing a grass trimming apparatus having a trimmer head assembly; providing a spinning support guide, including: a base mount disc; a base; and a base fastener; affixing the base mount disc to a lower portion of the trimmer head assembly; attaching the base to the base mount disc with the base fastener; placing the base on a trimmable surface; and operating the grass trimming apparatus.

A feature of this aspect of the invention includes the steps of: detaching the base from the base mount disc; placing one or more spacer discs adjacent the base mount disc; and reattaching the base with the base fastener such that the one or more spacer discs are disposed between the base mount disc and the base. In a variation of this feature, the base fastener is adapted to pass through openings in the base and the one or more spacer discs and threadably attach to an embedded threaded receptacle within the base mount disc.

In another feature, the base mount disc is cylindrical.

In yet another feature, the base is semispherical.

Another aspect of the present invention relates to a method of attaching a fixture for a trimmer head assembly. An exemplary such method includes the steps of securing a base mount disc with an imbedded threaded receptacle to a lower end of the trimmer head assembly; placing a first spacer disc with a central aperture and a first thickness proximate the base mount disc; placing a semispherical base with a central aperture proximate the spacer disc; inserting a base fastener through the central aperture of the semispherical base and the central aperture of the spacer disc; and threading the base fastener into the imbedded threaded receptacle.

A feature of this aspect further includes unthreading the base fastener from the imbedded threaded receptacle; withdrawing the base fastener from the central threaded receptacles; placing a second spacer disc having a central aperture and a second thickness between the first spacer disc and the semispherical base; reinserting the base fastener through the central apertures of the first spacer disc, the second spacer disc, and the semispherical base; and threading the base fastener into the imbedded threaded receptacle.

Another feature of the present invention relates to a kit for retrofitting a grass trimming apparatus with a spinning support guide. An exemplary kit includes a base mount disc; a base; one or more spacer discs; a base mount disc attachment means; and a base attachment means. Furthermore, the base mount disc is adapted to be affixed to a grass trimming device by the base mount disc attachment means. Further still, the base attachment means is adapted to removably attach the base and the one or more spacer discs to the base mount disc.

In a feature of this aspect of the invention, the base mount disc is cylindrical.

In another feature, the base is semispherical.

In yet another feature, the base mount disc attachment means comprises a plurality of flush mount screws adapted to penetrate completely through the base mount disc and partial through a lower portion of the grass trimming apparatus.

In another feature still, the base attachment means comprises a threaded receptacle embedded within the base mount disc and a threaded screw adapted to threadingly mate with the threaded receptacle. In a variation of this feature, each of the base and the one or more spacer discs includes a centrally located aperture. In yet another variation the threaded screw is sized to pass through the centrally located apertures.

In another feature of the present aspect, the base mount disc, the one or more spacer discs and the base are constructed from a plastic material.

In a further feature, the one or more spacer discs and the base each have a diameter of approximately two and one-half inches (2½").

In still another feature, each of the one or more spacer discs has a thickness between three-eighths inch (3/8") and one and five-eighths inches (1 5/8").

Yet another aspect of the present invention relates a method of retrofitting a spinning support guide to a grass trimming dev apparatus. An exemplary such method includes the steps of providing a kit for retrofitting a grass trimming apparatus with a spinning support guide; providing a grass trimming apparatus, including a trimmer head assembly; affixing, via the base mount disc attachment means, the base mount disc to a lower, rotatable portion of the trimmer head assembly; and attaching, via the base attachment means, the base to the base mount disc. Furthermore, an exemplary kit includes a base mount disc; a base; one or more spacer discs; a base mount disc attachment means; and a base attachment means.

A feature of this aspect further includes the step of placing, prior to attaching the base to the base mount disc, a first spacer disc of the one or more spacer discs proximate the base mount disc, such that upon attachment of the base, the first spacer disc is disposed between the base mount disc and the base. A variation of this feature further includes the step of placing, prior to attaching the base to the base mount disc, a second spacer disc of the one or more spacer discs proximate the first spacer disc, such that upon attachment of the base the first spacer disc and the second spacer disc are disposed between the base mount disc and the base. In another variation the first spacer disc has a first thickness and the second spacer disc has a second thickness, and wherein the first thickness is not equal to the second thickness.

In another aspect of the invention, a spinning support guide for a trimmer head assembly includes a base mount disc having an imbedded threaded receptacle; one or more spacer discs, each having a central aperture; a base having a central aperture; and a bottom fastener. The base mount disc is secured to a lower end of the trimmer head assembly, and preferably the housing of the trimming line, by one or more fasteners; the one or more spacer discs are disposed between the base mount disc and the base; and the bottom fastener is adapted to extend through the central apertures of the base and the one or more spacer discs and threadingly attach to the imbedded threaded receptacle so as to secure the base and the one or more spacer discs to the base mount disc.

In an alternative to this aspect, the base is directly attached to the housing.

In yet another alternative aspect to this, the base is integrally formed with the housing. In a feature thereof, one or more spacers also are integrally formed with the housing and the base so as to form a single-piece component defining the spinning support guide.

Another aspect of the present invention relates to a motorized trimming apparatus. An exemplary such apparatus includes a trimmer head assembly, including a spinning support guide; motor; and a shaft. Furthermore, the trimmer head assembly is disposed at a first end of the shaft and the motor is disposed proximate a second end of the shaft.

In a feature of this aspect of the invention, the spinning support guide is affixed to a lower end of the trimmer head assembly.

In another feature, the spinning support guide is affixed to a rotatable portion of the trimmer head assembly.

In yet another feature, the spinning support guide comprises a base mount disc and a semispherical base.

In a variation of this feature, the spinning support guide is permanently affixed to a lower end of the trimmer head assembly.

In yet another variation, the spinning support guide is detachable from the lower end of the trimmer head assembly.

In still another variation, the spinning support guide further comprises one or more spacer discs disposed between the base mount disc and the semispherical base.

In another variation, the spinning support guide includes a guide fastener, the guide fastener configured to affix the spinning support guide to a threaded receptacle at the lower end of the trimmer head assembly.

Another aspect of the present invention relates to a spinning support guide for a trimmer head assembly. An exemplary such spinning support guide includes base mount disc; a base, secured to the base mount disc; and one or more spacer discs, disposed between the base mount disc and the base.

In a feature of this aspect, the spinning support guide comprises guide fastener embedded within the spinning support guide, the guide fastener adapted to affix the spinning support guide to an underside of the trimmer head assembly.

In a variation of this feature, the guide fastener is threaded and adapted to threadably attach to an integral threaded receptacle on the underside of the trimmer head assembly.

In still another variation, the guide fastener includes a head with a hexagonal opening adapted for use with a hex key.

In another feature, the base is a semispherical base.

In still another feature, the one or more spacer discs includes a first spacer disc with a first thickness and a second spacer disc with a second thickness.

In a variation of this feature, the first thickness is different from the second thickness.

In another feature, the base mount disc is secured to the base by one or more disc fasteners.

In a variation of this feature, the one or more disc fasteners are flush mount machine screws.

In a feature, the one or more spacer discs and the base are constructed from plastic material.

In yet another feature, each of the one or more spacer discs has a thickness between three-eighths inch (⅜") and one and five-eighths inches (1⅝").

Another aspect of the present invention relates to a spinning support guide for a trimmer head assembly. An exemplary such spinning support guide includes a semispherical base; a base mount disc, the base mount disc being secured to the semispherical base by one or more flush mount machine screws; one or more spacer discs, each including a central aperture, each of the one or more spacer discs being disposed between the base mount disc and the semispherical base; and a guide fastener embedded within the spinning support guide. Furthermore, the guide fastener is adapted to threadingly attach to a threaded receptacle in an underside of the trimmer head assembly so as to secure the spinning support guide to the trimmer head assembly.

Another aspect of the present invention relates to a method of using a grass trimming apparatus. An exemplary such method includes the steps of: providing a grass trimming apparatus, including a trimmer head assembly having a spinning support guide at a bottom portion thereof, and a cutting mechanism positioned above the spinning support guide; holding the grass trimming apparatus in an operable position; placing the spinning support guide on a trimmable surface, whereby the spinning support guide provides a point of contact between the grass trimming apparatus and the trimmable surface; activating the cutting mechanism; trimming the cutting surface to a desired height; and moving the grass trimming apparatus along the trimmable surface while maintaining the point of contact.

In a feature of this aspect, the grass trimming apparatus further includes a shaft and a motor; wherein the motor is disposed proximate a first end of the shaft and the trimmer head assembly is disposed proximate a second end of the shaft; and wherein the motor propels the cutting mechanism.

In a variation of this feature, the shaft includes a handle portion adapted for holding the grass trimming apparatus in an operable position.

In another feature, the method further includes the step of adjusting the desired height by altering the spinning support guide.

In a variation of this feature, altering the spinning support guide includes the steps of: detaching the spinning support guide from the bottom portion of the trimmer head assembly; adding one or more spacer discs to the spinning support guide; and reattaching the spinning support guide to the bottom portion of the timer head assembly.

In another variation, each of the one or more spacer discs has a thickness of between three-eighths inch (3/8") and one and five-eighths inches (1 5/8").

In another feature of this aspect of the invention, the spinning support guide includes a semispherical base.

In yet another feature, the spinning support guide includes a base mount disc and a semispherical base.

In still another feature, the trimmable surface includes grass.

In still another feature, the trimmable surface includes weeds.

In yet another feature, the trimmable surface includes shrubbery.

In another feature still, the trimmable surface includes non-organic material.

Another aspect of the present invention relates to a method of using a grass trimming apparatus. An exemplary such method includes the steps of: providing a grass trimming apparatus having a trimmer head assembly; providing a spinning support guide, including a base, a base mount disc, and a guide fastener; disposing the guide fastener in an opening in the base; attaching the base mount disc to the base with one or more disc fasteners, partially embedding the guide fastener; affixing the spinning support guide to an underside of the trimmer head assembly; placing the spinning support guide on a trimmable surface; and operating the grass trimming apparatus.

A feature of this aspect of the invention further includes the steps of: detaching the spinning support guide from the underside of the trimmer head assembly; detaching the base mount disc from the base; placing one or more spacer discs adjacent the base; reattaching the base mount disc to the base with the one or more spacer discs disposed therebetween; and reattaching the spinning support guide to the underside of the trimmer head assembly.

In a variation of this feature, the guide fastener is adapted to pass through openings in the base mount disc and the one or more spacer discs and threadably attach to a threaded receptacle on the underside of the trimmer head assembly.

In a feature of this aspect, the base mount disc is cylindrical.

In yet another feature, the base is semispherical.

Another aspect of the present invention relates to a method of attaching a fixture for a trimmer head assembly. An exemplary such method includes removing a threaded end cap fastener from a threaded receptacle on an underside of the trimmer head assembly, providing a spinning support guide, including a threaded guide fastener having a head with a hexagonal opening, aligning the guide fastener with the threaded receptacle, threadably attaching the guide fastener to the threaded receptacle, thus securing the spinning support guide to the underside of the trimmer head assembly.

In a feature of this aspect, the guide fastener is threadably attached using a hex key.

In yet another feature, the guide fastener is threadably attached using an Allen wrench.

Another aspect of the present invention relates to a kit for retrofitting a grass trimming apparatus with a spinning support guide. An exemplary such kit includes a base mount disc, a base, and a guide fastener. Furthermore, the base mount disc is adapted to affix to the base and define a chamber for partially housing the guide fastener therein, and the guide fastener is adapted to threadably attach to a threaded receptacle on an underside of the grass trimming apparatus.

In a feature of this aspect of the present invention, the kit further includes one or more spacer discs.

In a variation of this feature, the one or more spacer discs and the base each have a diameter of approximately two and one-half inches (2 1/2").

In another variation, each of the one or more spacer discs has a thickness between three-eighths inch (3/8") and one and five-eighths inches (1 5/8").

In another feature, the kit includes one or more disc fasteners for attaching the base mount disc to the base.

In a variation of this feature, the one or more disc fasteners are flush-mount machine screws.

In yet another feature, the base is a semispherical base.

In still another feature, the guide fastener includes a head with a hexagonal opening.

In a variation of this feature, the kit further comprises a hex key for rotating the guide fastener.

In another feature, the base mount disc is cylindrical.

In still another feature, the base mount disc includes a centrally located aperture.

In another feature still, the base mount disc and base are constructed from a plastic material.

Another aspect of the present invention relates to a kit for retrofitting a grass trimming apparatus with a spinning support guide. An exemplary such kit includes a base mount disc; a semispherical base; a guide fastener having a head with a hexagonal opening; one or more spacer discs; one or more disc fasteners; and a hex key. Furthermore, the base mount disc is adapted to affix to the semispherical base with the one or more disc fasteners and define a chamber for partially housing the guide fastener therein, and the hex key is adapted to rotate the guide fastener to threadably attach to a threaded receptacle on an underside of the grass trimming apparatus.

Another aspect of the present invention relates to a method of retrofitting a spinning support guide to a grass trimming apparatus. An exemplary such method includes the steps of: providing a kit for retrofitting a grass trimming apparatus with a spinning support guide, the kit including: a base mount disc; a base; one or more spacer discs; a guide fastener including a head with a hexagonal opening; one or more disc fasteners; and a hex key; providing a grass trimming apparatus, including a trimmer head assembly having a threaded receptacle on the underside thereof; attaching the base mount disc to the base with the one or more disc fasteners, such that the guide fastener is partially disposed within the base; aligning the guide fastener with the threaded receptacle; and rotating the guide fastener with the hex key, thereby threadably attaching the guide fastener to the threaded receptacle.

A feature of this aspect includes the step of placing, prior to attaching the base to the base mount disc, a first spacer disc of the one or more spacer discs between the base mount disc and the base, such that upon attachment of the base, the first spacer disc is disposed between the base mount disc and the base.

In a variation of this feature, the method further includes the step of placing, prior to attaching the base to the base mount disc, a second spacer disc of the one or more spacer discs proximate the first spacer disc, such that upon attachment of the base the first spacer disc and the second spacer disc are disposed between the base mount disc and the base.

In another variation of this feature, the first spacer disc has a first thickness and the second spacer disc has a second thickness, and wherein the first thickness is not equal to the second thickness.

In another feature of this aspect, the base is a semispherical base.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein, FIG. 1 is perspective view of a preferred embodiment of a grass trimming apparatus including a trimmer head assembly with a spinning support guide in accordance with one or more aspects of the present invention;

FIG. 2 is an exploded perspective view of the trimmer head assembly of FIG. 1;

DETAILED DESCRIPTION

Figure 3:
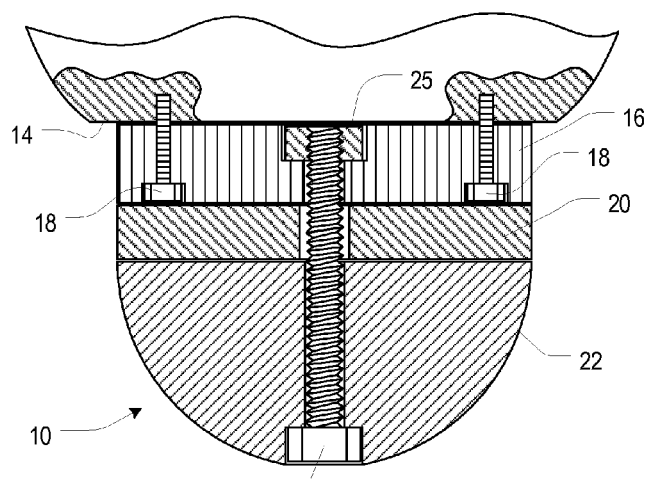
FIG. 3 is a cross-sectional view of a portion of the trimmer head assembly including the spinning support guide taken along line 3-3 in FIG. 1.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

FIG. 1 is a perspective view of a grass trimming apparatus 50, including a trimmer head assembly 12 with a spinning support guide 10 in accordance with one or more preferred embodiments of the present invention. The spinning support guide 10 is removably attached to the underside of the housing 14 for the trimming line 15 and is adjustable in spacing relative to the housing 14. In alternative embodiments, the spinning support guide 10 is permanently fixed to the housing 14. For example, the spinning support guide 10 may be integrally formed with a portion of the housing 14.

The spinning support guide 10 defines a point of contact between the grass trimming apparatus 50 and the ground when the grass trimming apparatus 50 is used, and preferably defines the sole point of contact. The shape of the spinning support guide 10 preferably is rounded. For example, the shape may be semispherical, similar to half of a ball.

The rounded shape is believed to minimize the surface area of the point of contact between the grass trimming apparatus 50 and the ground when the grass trimming apparatus is used, thereby reducing friction between the spinning support guide 10 and the ground that otherwise might be experienced with a different shape of the spinning support guide 10. It is believed that such reduced friction, in turn, allows a user to more easily maneuver the grass trimming apparatus 50 along the ground as well as operate the grass trimming apparatus at different angles to the ground for trimming and edging.

Figure 3A:
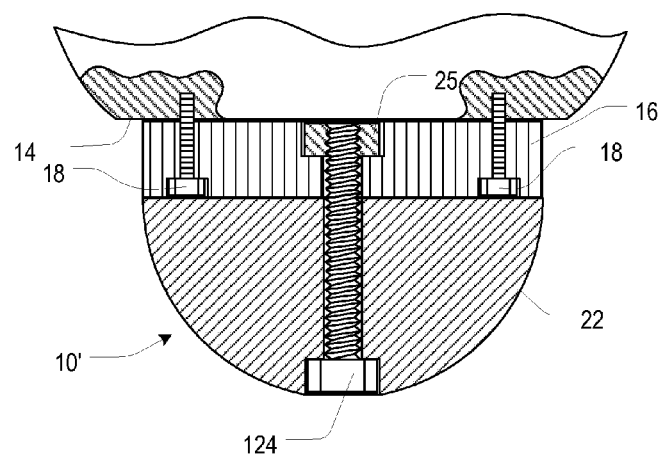
FIG. 3A is a cross-sectional view of a portion of another trimmer head assembly including a spinning support guide in accordance with one or more aspects of the invention.
Figure 3B:
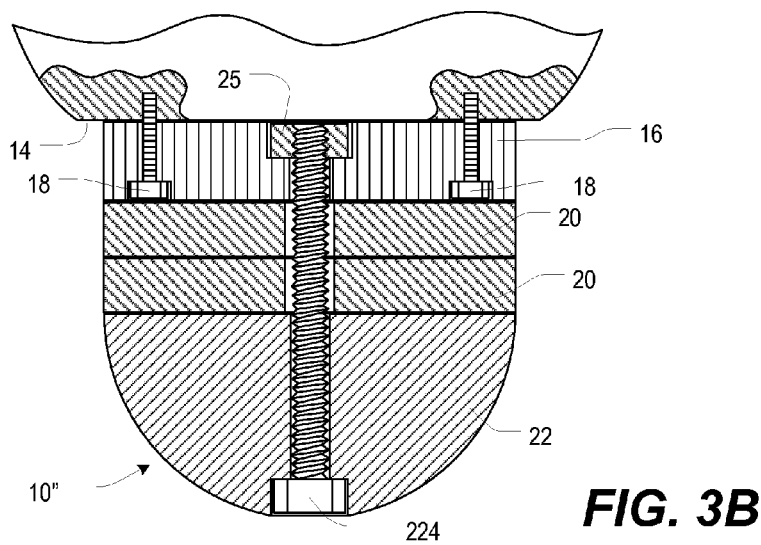
FIG. 3B is a cross-sectional view of a portion of yet another trimmer head assembly including a spinning support guide in accordance with one or more aspects of the invention.

FIG. 2 is an exploded view of the trimmer head assembly 12 of FIG. 1. FIG. 3 is a cross sectional view taken at line 3-3 of the spinning support guide 10 of FIG. 1. FIGS. 3A and 3B are cross-sectional views of alternate embodiments of a spinning support guide in accordance with one or more aspects of the present invention, wherein like elements are referred to with like reference numbers. (Note that in FIGS. 3, 3A and 3B, for the purpose of clarity, the fasteners 18,24,124,224 are not shown in cross-section.)

As shown in FIGS. 2 and 3, the spinning support guide 10 includes a base mount disc 16, a spacer disc 20, and a semispherical base 22. In one or more alternative embodiments, as seen in FIG. 3A, the spinning support guide 10' does not include a spacer disc. In one or more alternative embodiments, as seen in FIG. 3B, the spinning support guide 10" includes more than one spacer disc 20.

Returning to FIGS. 2 and 3, the base mount disc 16 is secured to the underside of the housing 14 by two or more fasteners 18, such as flush mount machine screws. The base mount disc 16 includes a centrally-located bolt opening therethrough, leading to an embedded threaded receptacle 25, such as a recessed nut. The spacer disc 20 includes a central bolt opening therethrough and is disposed between the base mount disc 16 and the semispherical base 22. The use of multiple spacer discs 20, as seen in FIG. 3B, allows a user to adjust the cutting height of the grass trimming apparatus 50.

Figure 4:
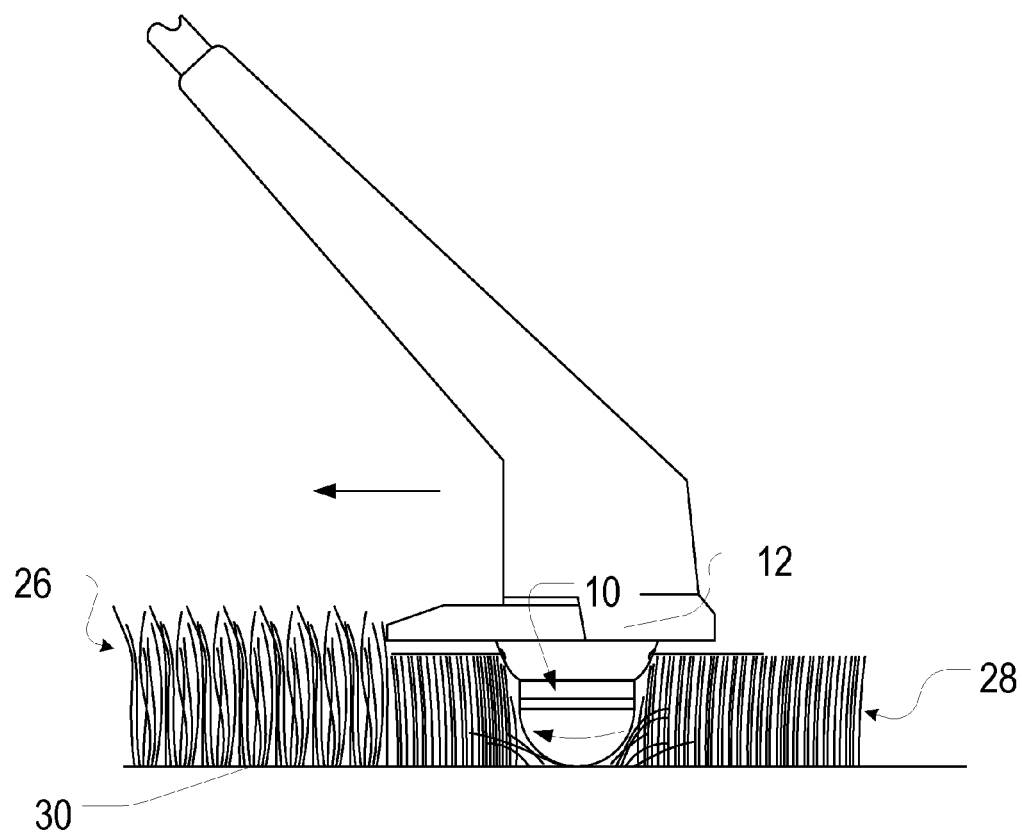
FIG. 4 is a side view of the trimmer head assembly of the grass trimming apparatus of FIG. 1 being used to trim grass.

As will be appreciated from FIG. 4, the spinning support guide 10 includes a semispherical base 22, a portion of which is in direct contact with the ground 30 when the grass trimming apparatus 50 is used. The shape of the semispherical base 22 easily allows a user to tilt and angle the grass trimming apparatus 50 for trimming and edging. It will be appreciated that the point of contact with the ground will change depending on the angle of operation.

Referring back to FIGS. 3, 3A and 3B, the semispherical base 22 includes a central bolt opening therethrough, sized to accommodate a bottom fastener 24, such as a bolt or a machine screw. The bottom fastener 24 is adapted to be inserted through the bolt holes of the semispherical base 22, the one or more spacer discs 20 and the base mount disc 16, and threadably attach to the embedded threaded receptacle 25, thereby securing the spinning support guide 10 to the underside of the trimming area 14. It will be appreciated that a bottom fastener 124 of reduced length, as seen in FIG. 3A, may be used when no spacers are included in the spinning support guide 10. It will further be appreciated that a bottom fastener 224 of increased length, as seen in FIG. 3B, may be used when more than one spacer 20 is included in the spinning support guide 10 trimmer head assembly.

In one or more preferred embodiments, the spacer disc 20 and the semispherical base 22 are constructed from plastic material having a diameter of about two-and-one-half (2½) inches. The thickness of the spacer disc 20 may vary. It is contemplated that the spinning support guide 10 may accommodate spacer discs 20 having a thickness from about three-eighths of an inch (⅜") to about one-and-five-eighths inches (1⅝").

To adjust the height of the spinning support guide 10, a user removes the base 22 and adds, removes, or replaces one or more of the spacer discs 20. To accomplish this, a user rotatably loosens the bottom fastener 24 from the embedded threaded receptacle 25. The user then removes the bottom fastener 24 and either adds one or more spacer discs 20 to be disposed between the base mount disc 16 and the base 22, and/or removes one or more spacer discs 20 disposed between the base mount disc 16 and the base 22. Finally, the user reattaches the bottom fastener 24 to secure the base 22, as well as any of the one or more spacer discs 20, to the base mount disc 16.

FIG. 4 is a side view of the grass trimming apparatus 50 of FIG. 1 in use. As shown, the spinning support guide 10 is placed upon ground 30 having untrimmed grass 26. The semispherical base 22 of the spinning support guide 10 preferably provides the sole contact between the grass trimming apparatus and the ground 30. The support thereby provided by the spinning support guide 10 relieves the user of the burden and strain of supporting the full weight of the grass trimming apparatus 50. It is further noted that the rotational movement of the semispherical base 22 increases the ease of moving the semispherical base 22 along the ground 30 by negating the static friction that would otherwise exist between the ground 30 and a stationary semispherical base 22.

Figure 5A:
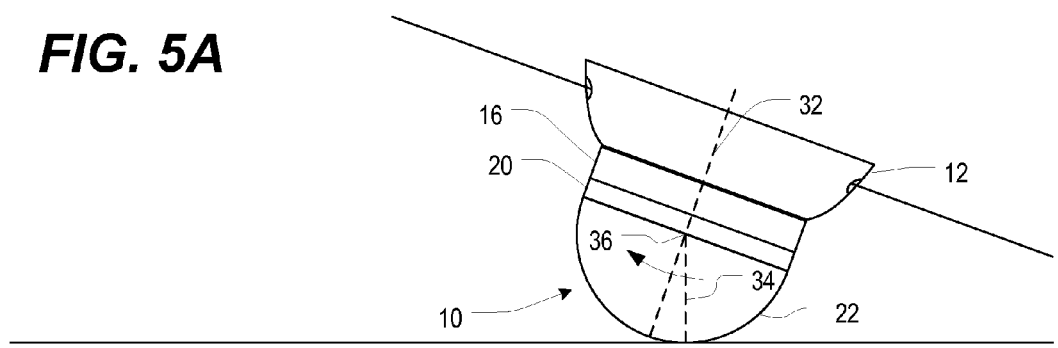
FIGS. 5A-5C are side views of the trimmer head assembly of FIG. 1 being used to trim grass at various angles of operation.
Figure 5B:
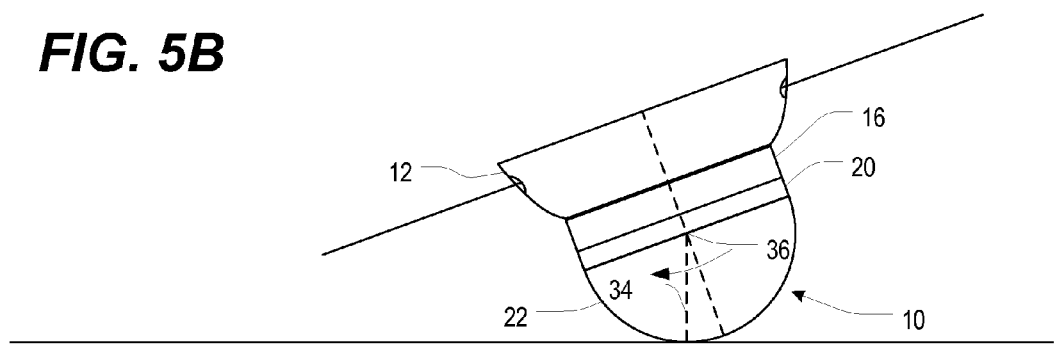
Figure 5C:
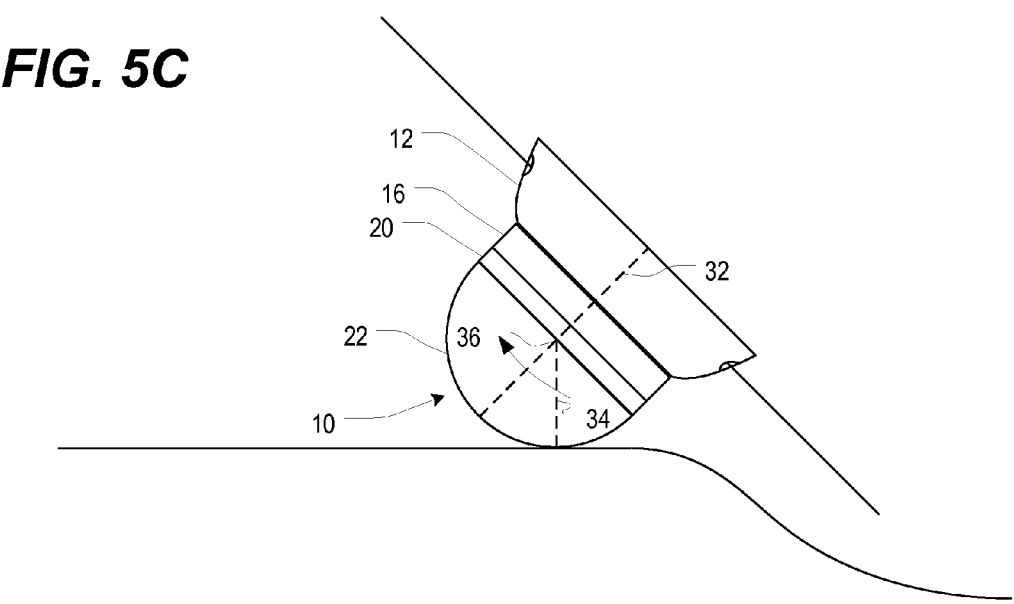

FIGS. 5A-5C are front views of a lower portion of the trimmer head assembly 12 including the spinning support guide 10. These figures illustrate the trimmer head assembly 12 in use at various angles of operation. At each angle of operation, the trimmer head assembly 12 maintains a general point of contact with the ground. The point of contact varies with the angle of operation; however, all points of contact are on the surface of the generally semispherical base 22, and are generally a constant distance 34 from a focal point 36 located along the central axis of rotation 32. In other words, regardless of the angle of operation, the distance between the point of contact and the focal point 36 remains approximately constant during use of the grass trimming apparatus 50. It will be appreciated that the distance 34 is approximately equal to the radius of the semispherical base 22.

In one or more aspects of the invention, a kit is provided for retrofitting a grass trimming apparatus with a spinning support guide. Such a kit includes some or all of the components illustrated and discussed above that are associated with the spinning support guide 10,10',10". In at least one preferred embodiment, a spinning support guide kit includes a base mount disc, one or more spacer discs, a semispherical base, one or more base mount disc fasteners for affixing the base mount disc to the lower, rotatable portion of a trimmer head assembly, and one or more bottom fasteners.

Figure 6:
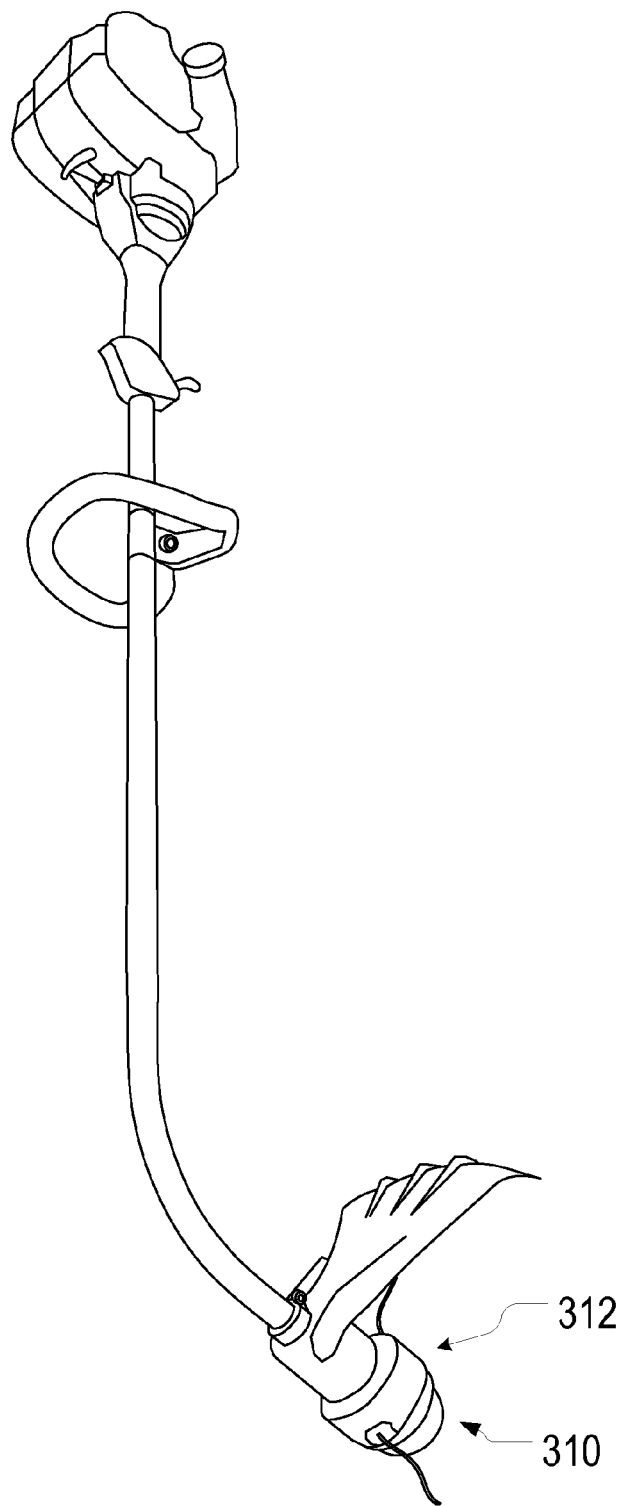
FIG. 6 is a perspective view of an alternative preferred embodiment of a grass trimming apparatus including a trimmer head assembly with a spinning support guide in accordance with one or more aspects of the present invention.
Figure 7:
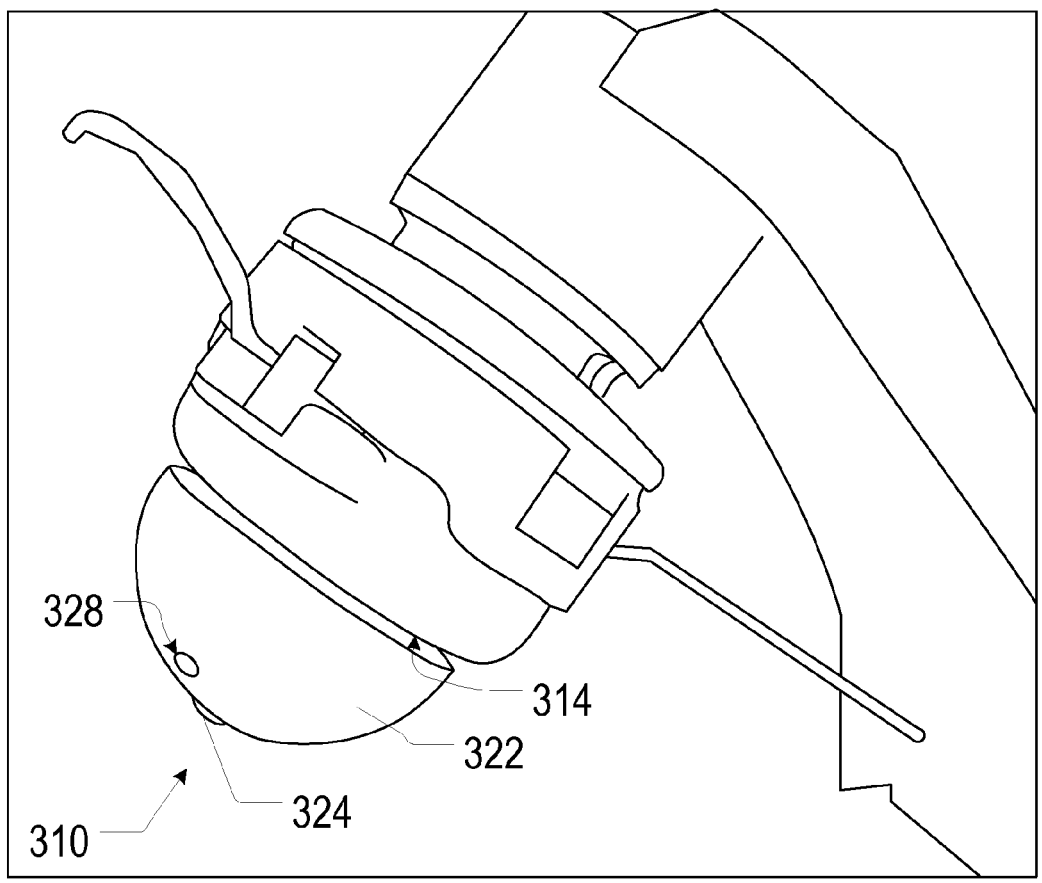
FIG. 7 is a side view of a portion of the trimmer head assembly of FIG. 6.
Figure 8:
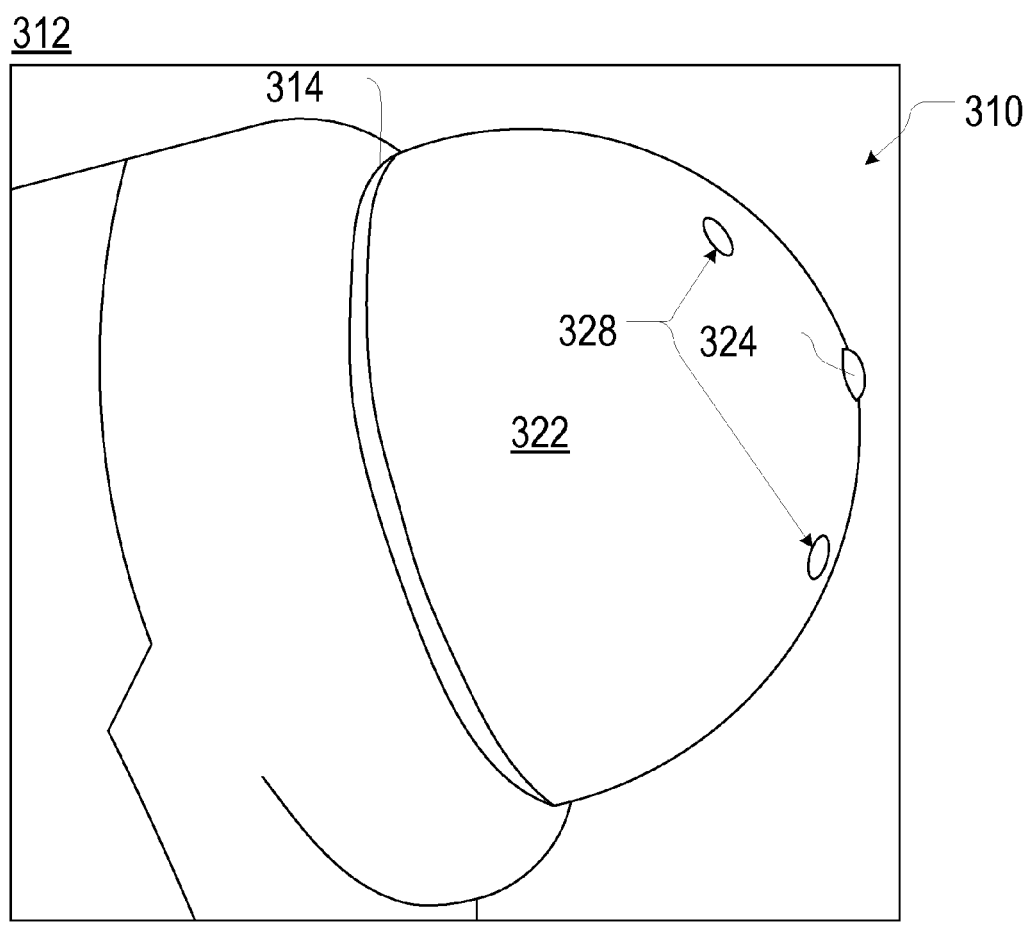
FIG. 8 is an enlarged side view of a portion of the trimmer head assembly of FIG. 6.
Figure 9:
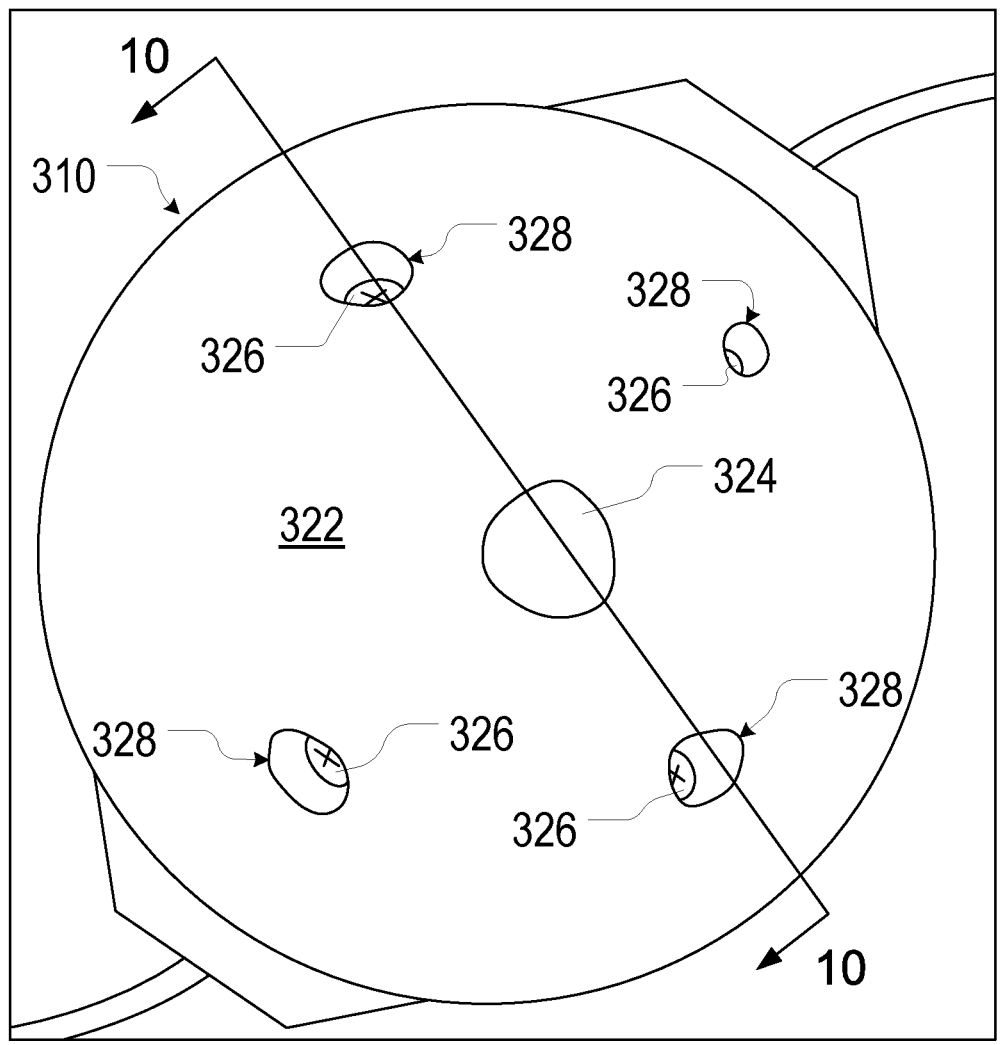
FIG. 9 is a detailed bottom view of a portion of the trimmer head assembly of FIG. 6.
Figure 10:
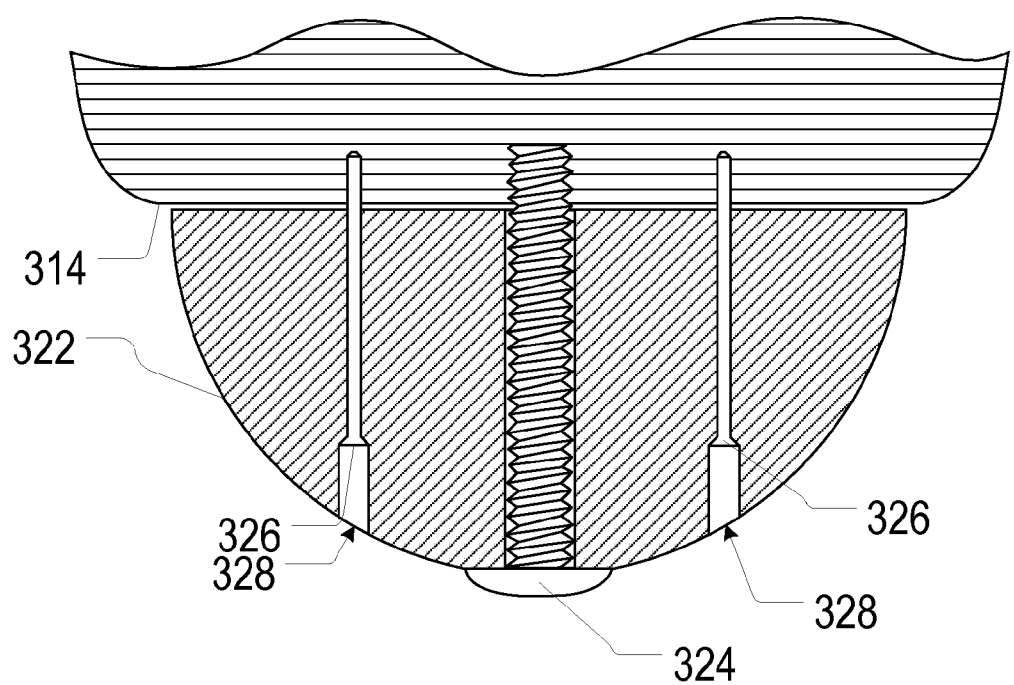
FIG. 10 is a cross-sectional view of a portion of the trimmer head assembly of FIG. 6.

FIG. 6 is a perspective view of an alternative embodiment of a grass trimming apparatus 350 including a trimmer head assembly 312 with a spinning support guide 310 in accordance with one or more aspects of the present invention. FIG. 7 is a side view of the trimmer head assembly 312 of FIG. 6. FIG. 8 is another side view of the trimmer head assembly 312 of FIG. 6. FIG. 9 is a bottom view of the trimmer head assembly 312 of FIG. 6. FIG. 10 is a cross sectional view of the spinning support guide 310 taken along line 10-10 of FIG. 9.

As shown in FIGS. 6-10, the spinning support guide 310 is affixed to the underside of the housing 314. The spinning support guide 310 comprises a semispherical base 322 and trimmer head assembly, one or more base fasteners including a centrally located base fastening bolt 324, and a plurality of fastening screws 326. Both the base fastening bolt 324 and the plurality of fastening screws 326 completely extend through the base 322 and partially extend through the underside of the trimming area 314 of the trimmer head assembly so as to securely fasten the base 322 to the remainder of the grass trimming apparatus 350.

As seen in FIGS. 7-10, the base fastening bolt 324 is centrally located and protrudes slightly beyond the surface of the semispherical base 322. The plurality of fastening screws 326 are recessed within a plurality of openings 328 in the semispherical base 322, as perhaps best shown in FIGS. 9 and 10. While in use, a portion of the semispherical base 322 is in direct contact with the ground. The shape of the semispherical base 322 easily allows a user to tilt and angle the grass trimming apparatus 350. It will be appreciated that the point of contact with the ground will change depending on the angle of operation of the trimmer head assembly.

Figure 11:
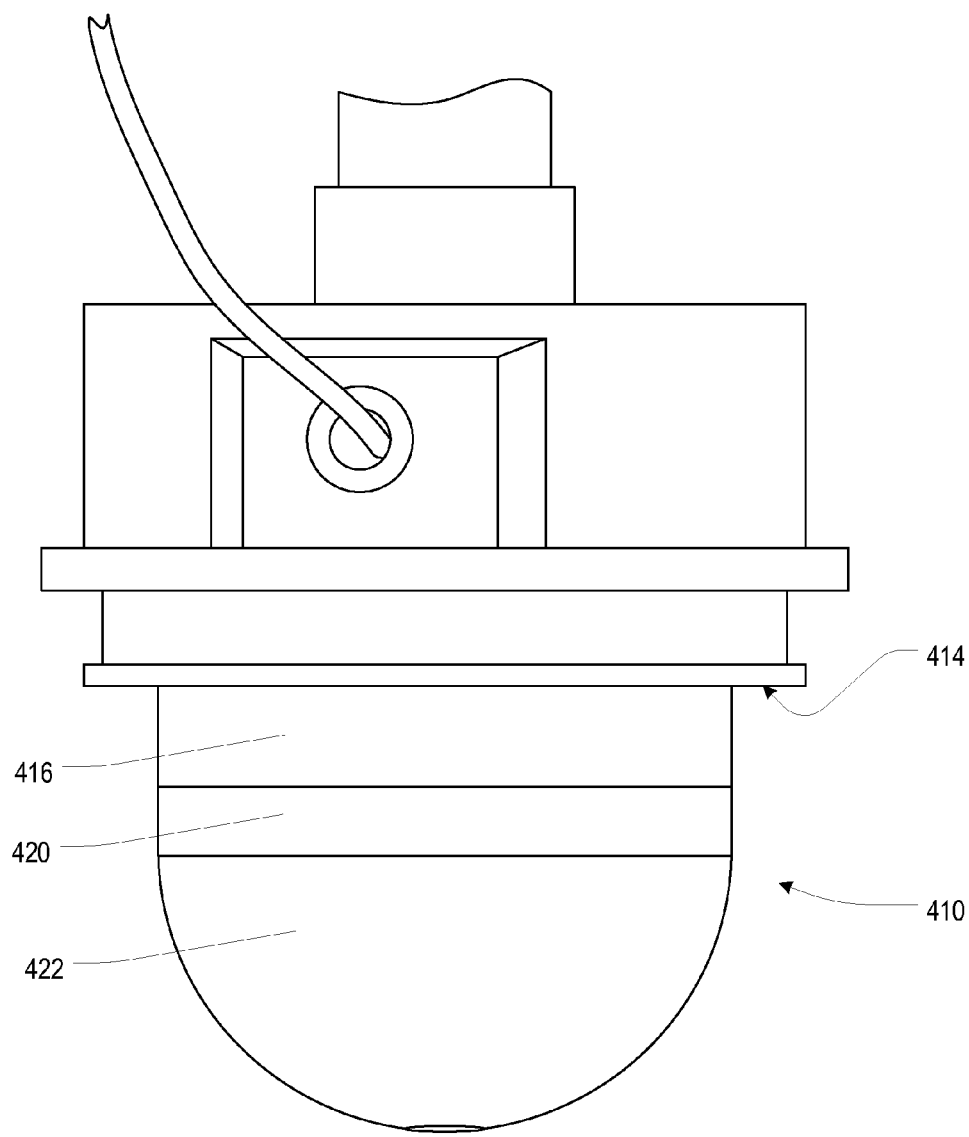
FIG. 11 is a perspective view of a preferred embodiment of a grass trimming apparatus including a trimmer head assembly with a spinning support guide in accordance with one or more aspects of the present invention.

FIGS. 11-22 illustrate another preferred embodiment of a grass trimming apparatus including a trimmer head assembly 412 with a spinning support guide 410. FIG. 11 is a side view of the trimmer head assembly 412. The trimmer head assembly 412 includes a removable spinning support guide 410 attached to an underside of the housing assembly 414.

Figure 12:
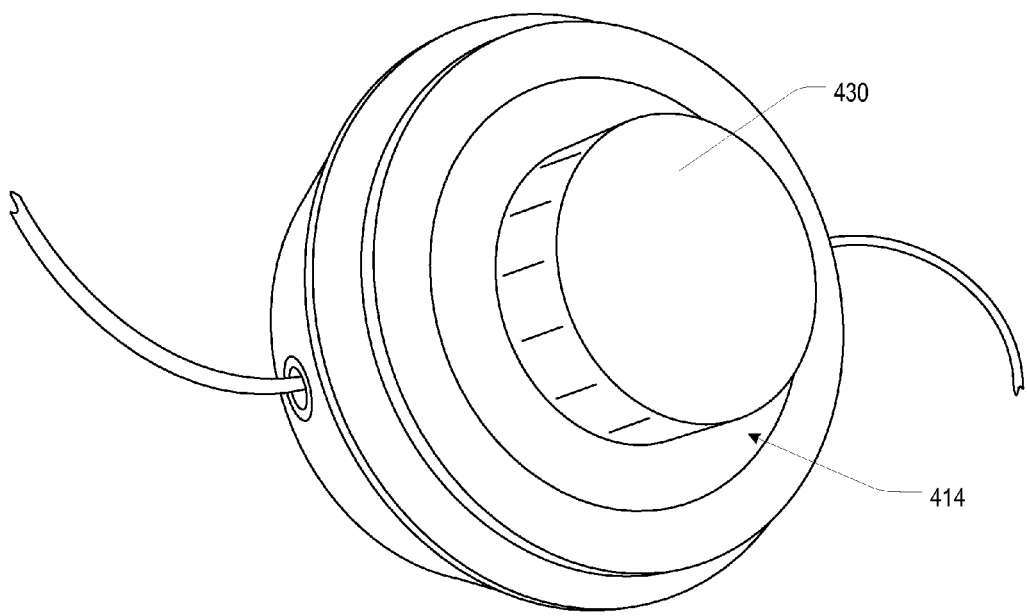
FIG. 12 is a perspective view of the trimmer head assembly of FIG. 11 with a standard end cap.
Figure 13:
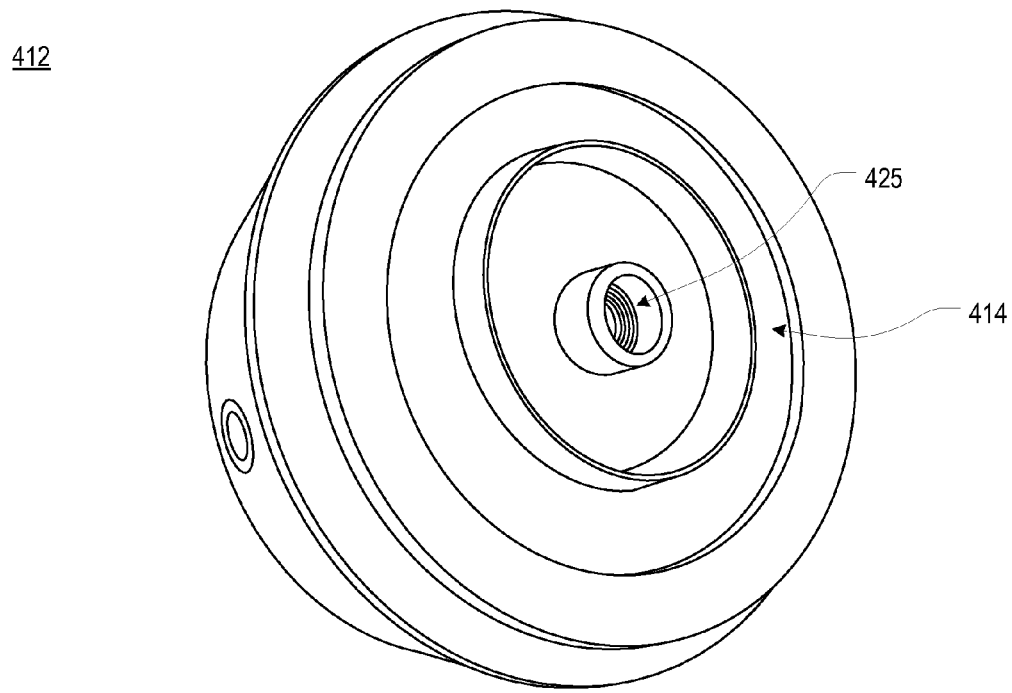
FIG. 13 is a perspective view of the trimmer head assembly of FIG. 11 with the spinning support guide removed and standard end cap removed.
Figure 14:
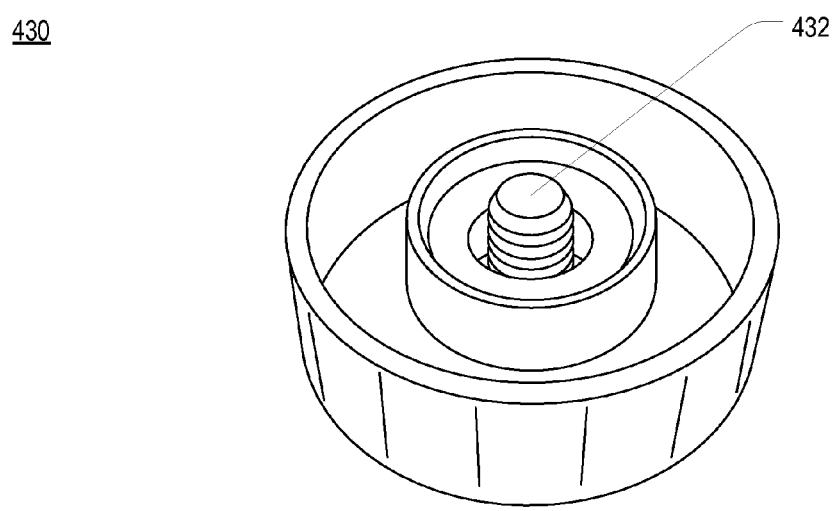
FIG. 14 is a perspective view of the standard end cap of FIG. 12.

FIG. 12 is a perspective view of the trimmer head assembly 412 of FIG. 11 with a standard end cap 430 threadably attached to the underside of the housing 414. Many available grass trimming apparatuses include such a threadably attached end cap. FIG. 13 is a perspective view of the trimmer head assembly 412 of FIG. 12 with the standard end cap 430 removed to reveal an integral threaded receptacle 425 on the underside of the housing 414. FIG. 14 is a detailed view of the standard end cap 430, including a threaded end cap fastener 432. The integral threaded receptacle 425 is adapted to threadably receive the threaded end cap fastener 432, thus attaching the standard end cap 430 to the underside of the housing 414.

Figure 15:
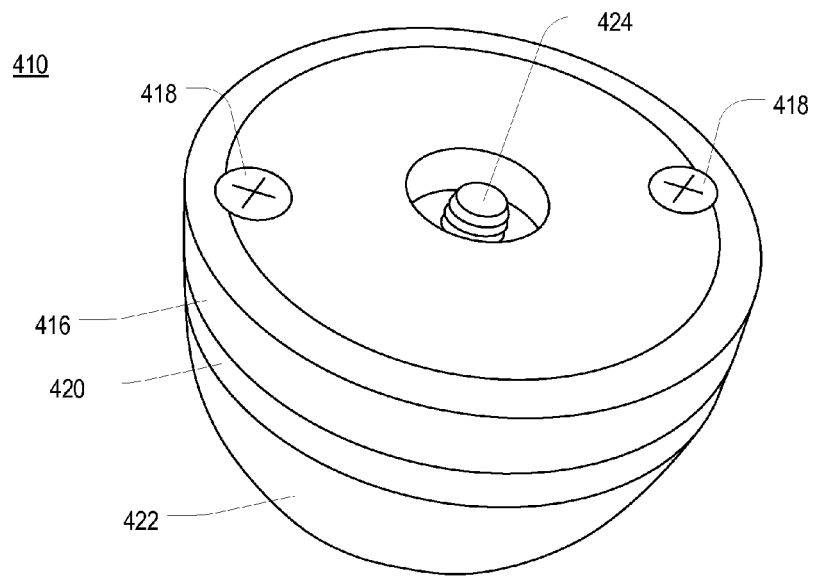
FIG. 15 is a perspective view of the spinning support guide of FIG. 11.
Figure 16:
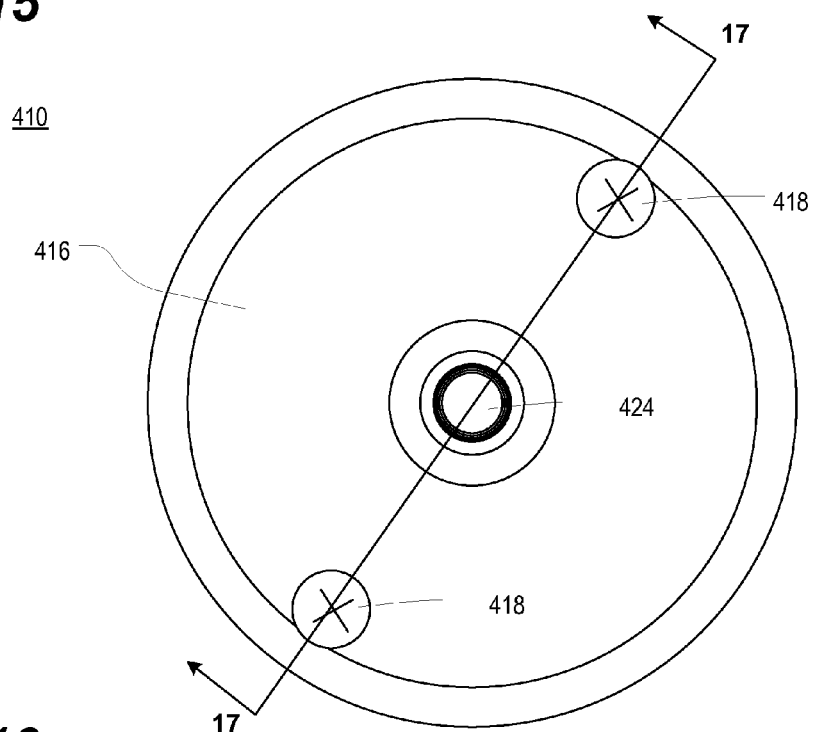
FIG. 16 is a top view of the spinning support guide of FIG. 11.
Figure 17:
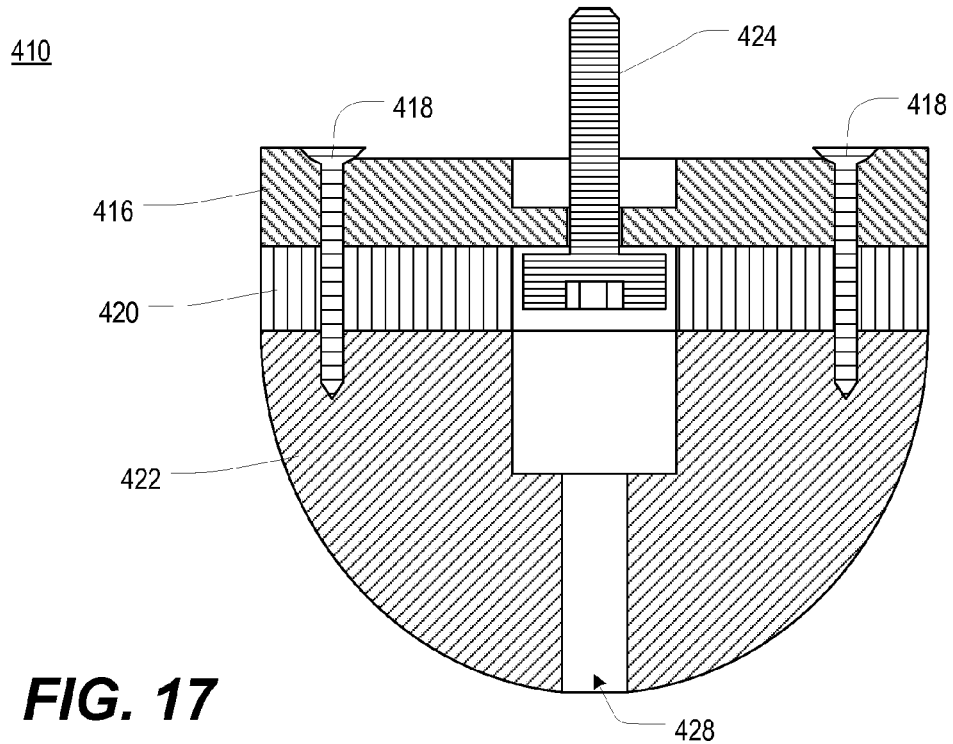
FIG. 17 is a cross sectional view of the spinning support guide of FIG. 11 taken along line 17-17.
Figure 18:
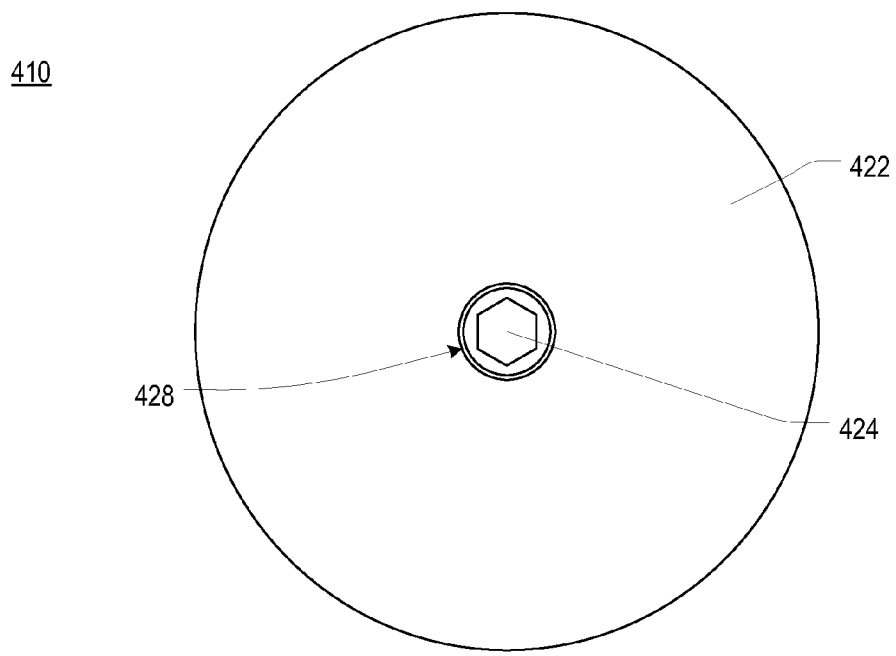
FIG. 18 is a bottom view of the spinning support guide of FIG. 11.
Figure 19:
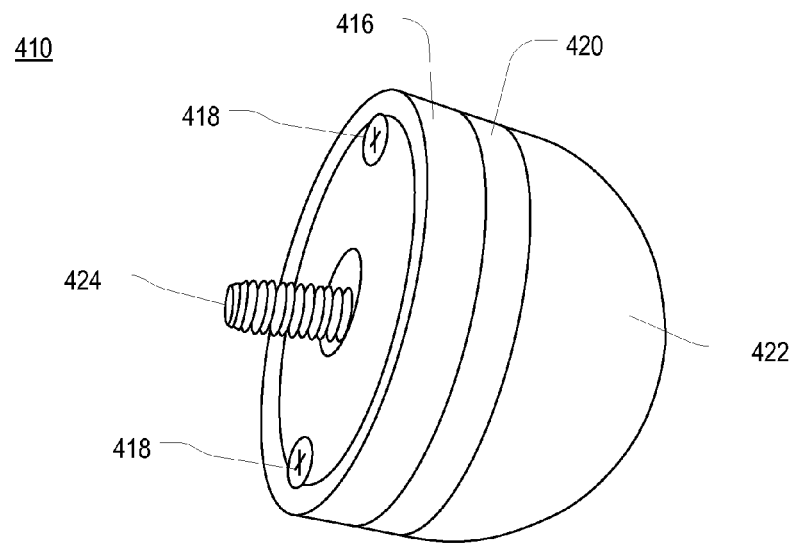
FIG. 19 is a perspective view of the spinning support guide of FIG. 11.
Figure 20:
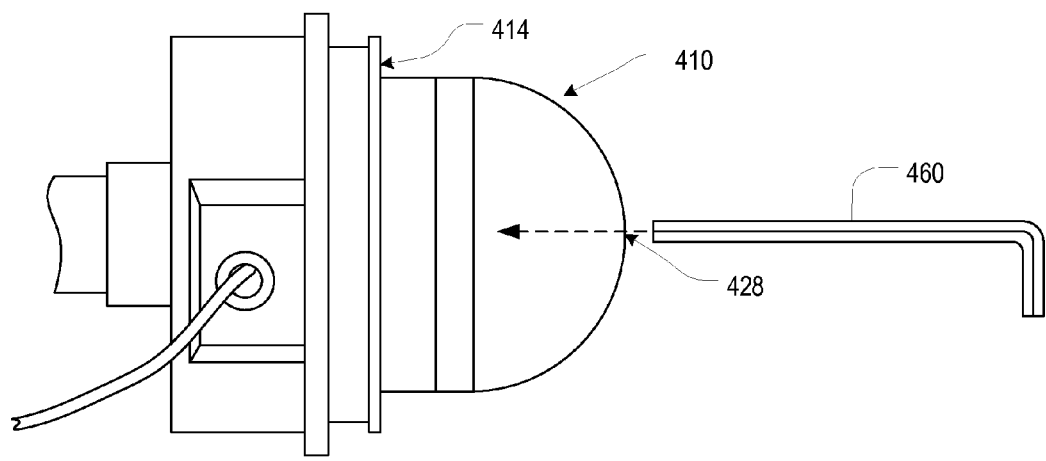
FIG. 20 is a side view of the trimmer head assembly of FIG. 11.

FIGS. 15-19 show the spinning support guide 410 in detail. FIG. 15 is a detailed perspective view of the spinning support guide 410 of FIG. 11. FIG. 16 is a top view of the spinning support guide 410 of FIG. 11. FIG. 17 is a cross-sectional view of the spinning support guide 410 taken along line 17-17 of FIG. 16. FIG. 18 is a bottom view of the spinning support guide 410 of FIG. 11. FIG. 19 is a perspective view of the spinning support guide 410.

The spinning support guide 410 includes a base mount disc 416, a spacer disc 420, and semispherical base 422. As best seen in FIG. 17, the base mount disc 416, spacer disc 420 and semispherical base 422 are attached using two disc fasteners 418, such as flush mount machine screws. It is contemplated that a user may alter the total height of the spinning support guide 410 by removing the disc fasteners 418 and adding or subtracting spacer discs 420.

The spinning support guide 410 further comprises a guide fastener 424. The guide fastener 424 is configured to affix the spinning support guide 410 to the underside of the housing 414. The guide fastener 424 is threaded and adapted to threadably attach to the integral threaded receptacle 425 on the underside of the housing 414. The guide fastener 424 includes a hexagonal opening on its head adapted for use with a hex key or Allen wrench 460. As best shown in FIG. 17, the guide fastener 424 is embedded within the spinning support guide 410. The semispherical base 422 includes a bottom opening 428 providing access to the head of the guide fastener 424.

To attach the spinning support guide 410 to the underside of the housing 414, a user must remove the standard end cap 430, align the guide fastener 424 with the integral threaded receptacle 425, insert a hex key or Allen wrench 460 into the bottom opening 428, engage the head of the guide fastener 424 with the hex key or Allen wrench 460, and rotate the hex key or Allen wrench 460 to threadably attach the guide fastener 424 to the integral threaded receptacle 425.

Figure 21:
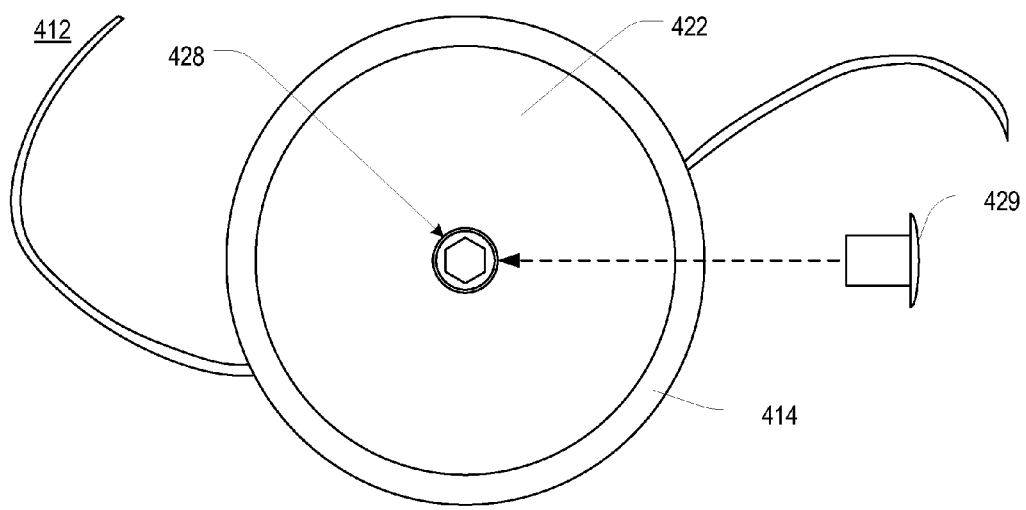
FIGS. 21 and 22 are bottom views of the trimmer head assembly of FIG. 11.
Figure 22:
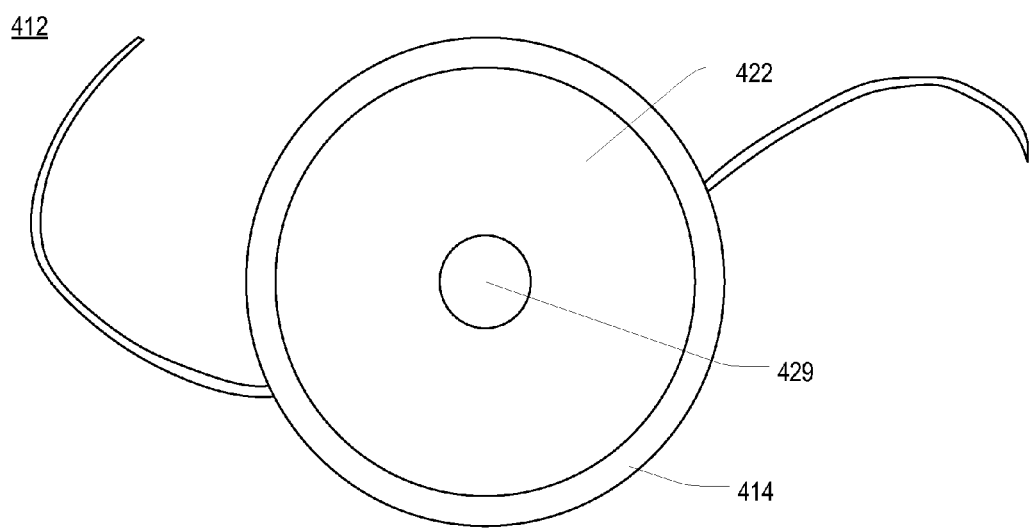

FIGS. 21 and 22 are bottom views of the trimmer head assembly 412 of FIG. 11. As seen in FIGS. 21 and 22, the spinning support guide 410 may include an opening cover 429 adapted to be inserted and cover the bottom opening 428. The opening cover 429 must be removed prior to accessing the guide fastener 424.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A kit for retrofitting a grass trimming apparatus with a spinning support guide, the grass trimming apparatus comprising a trimmer head assembly comprising a housing and a trimming line partially disposed within the housing, at least part of the trimming line extending external to the housing for effecting grass trimming when spun, wherein the kit includes
    (a) components for assembly as a spinning support guide that is removably attachable to an underside of the housing of the grass trimming apparatus, the components including
        (A) a base mount disc removably securable to the underside of the housing, the base mount disc including a central opening defined therethrough,
        (B) a plurality of spacer discs each including a central opening defined therethrough,
        (C) a semispherical base including a central opening defined therethrough,
        (D) a fastener sized and dimensioned to correspond to the central openings of the base mount disc, the plurality of spacer discs, and the semispherical base, and
        (E) a threaded receptacle configured to threadably receive an end of the fastener,
        (F) wherein the base mount disc, the plurality of spacer discs, and the semispherical base are configured to be coupled together by disposing the fastener within the opening in each of the base mount disc, the plurality of spacer discs, and the semispherical base, a portion of the fastener proximate one of its ends being threadably received within the threaded receptacle;
    (b) wherein the components are configured such that, when assembled as a spinning support guide utilizing a first particular set of one or more the plurality of spacer discs and attached to the trimmer head assembly of the grass trimming apparatus, operating the grass trimming apparatus by
        (i) holding the grass trimming apparatus in an operable position,
        (ii) placing the spinning support guide on a first trimmable surface, whereby the spinning support guide provides a point of contact between the grass trimming apparatus and the first trimmable surface, and
        (iii) effecting spinning of the trimming line, results in trimming a portion of the first trimmable surface to a first height;
    (c) wherein the components are configured such that, when assembled as a spinning support guide utilizing a second particular set of one or more of the plurality of spacer discs and attached to the trimmer head assembly of the grass trimming apparatus, operating the grass trimming apparatus by
        (i) holding the grass trimming apparatus in an operable position,
        (ii) placing the spinning support guide on a second trimmable surface, whereby the spinning support guide provides a point of contact between the grass trimming apparatus and the second trimmable surface, and
        (iii) effecting spinning of the trimming line, results in trimming a portion of the second trimmable surface to a second height; and
    (d) wherein the second height differs from the first height based on a difference in height of the first set of one or more spacer discs and the second set of one or more spacer discs.

2. The kit of claim 1, wherein each of the plurality of spacer discs has a thickness of between three-eighths inch (3/8") and one and five-eighths inches (1 5/8").

3. The kit of claim 1, wherein, the fastener is configured for use with a hex key.

4. The kit of claim 3, wherein the kit further includes a hex key.

5. The kit of claim 1, wherein the fastener is configured for use with an Allen wrench.

6. The kit of claim 1, wherein the kit includes multiple fasteners, and the multiple fasteners include fasteners of different length.

7. The kit of claim 1, wherein the first trimmable surface and the second trimmable surface are the same surface.

8. The kit of claim 1, wherein the first trimmable surface and the second trimmable surface are different trimmable surfaces.

9. A kit for retrofitting a grass trimming apparatus with a spinning support guide, the grass trimming apparatus comprising a trimmer head assembly comprising a housing and a trimming line partially disposed within the housing, at least part of the trimming line extending external to the housing for effecting grass trimming when spun, wherein the kit includes
    (a) components for assembly as a spinning support guide that is removably attachable to an underside of the trimmer head assembly of the grass trimming apparatus, the components including
        (A) a base mount disc including a central opening defined therethrough,
        (B) a plurality of spacer discs each including a central opening defined therethrough,
        (C) a semispherical base including a central opening defined therethrough,
        (D) a fastener sized and dimensioned to correspond to the central openings of the base mount disc, the plurality of spacer discs, and the semispherical base, and
        (E) wherein the base mount disc, the plurality of spacer discs, and the semispherical base are configured to be coupled together and secured to the trimmer head assembly of the grass trimming apparatus by disposing the fastener within the opening in each of the base mount disc, the plurality of spacer discs, and the semispherical base and causing a portion of the fastener proximate one of its ends to be threadably received within a threaded receptacle of the trimmer head assembly;
    (b) wherein the components are configured such that, when assembled as a spinning support guide utilizing a first particular set of one or more the plurality of spacer discs and attached to the trimmer head assembly of the grass trimming apparatus, operating the grass trimming apparatus by
        (i) holding the grass trimming apparatus in an operable position,
        (ii) placing the spinning support guide on a first trimmable surface, whereby the spinning support guide provides a point of contact between the grass trimming apparatus and the first trimmable surface, and
        (iii) effecting spinning of the trimming line, results in trimming a portion of the first trimmable surface to a first height;
    (c) wherein the components are configured such that, when assembled as a spinning support guide utilizing a second particular set of one or more of the plurality of spacer discs and attached to the trimmer head assembly of the grass trimming apparatus, operating the grass trimming apparatus by
  (i) holding the grass trimming apparatus in an operable position,
  (ii) placing the spinning support guide on a second trimmable surface, whereby the spinning support guide provides a point of contact between the grass trimming apparatus and the second trimmable surface, and
  (iii) effecting spinning of the trimming line,
  results in trimming a portion of the second trimmable surface to a second height; and
(d) wherein the second height differs from the first height based on a difference in height of the first set of one or more spacer disc and the second set of one or more spacer discs.

10. The kit of claim 9, wherein each of the plurality of spacer discs has a thickness of between three-eighths inch (3/8") and one and five-eighths inches (1 5/8").

11. The kit of claim 9, wherein, the fastener is configured for use with a hex key.

12. The kit of claim 11, wherein the kit further includes a hex key.

13. The kit of claim 9, wherein the fastener is configured for use with an Allen wrench.

14. The kit of claim 13, wherein the kit further includes an Allen wrench.

15. The kit of claim 9, wherein the kit includes multiple fasteners.

16. The kit of claim 15, wherein the multiple fasteners include fasteners of different length.

17. A system comprising:
  (a) grass trimming apparatus comprising a trimmer head assembly including
    (i) a housing, and
    (ii) a trimming line partially disposed within the housing,
    (iii) wherein at least part of the trimming line extends external to the housing for effecting grass trimming when spun;
  (b) a spinning support guide that is removably attached to an underside of the housing of the grass trimming apparatus, the spinning support guide comprising
    (A) a base mount disc removably secured to the underside of the housing, the base mount disc including a central opening defined therethrough,
    (B) a first set of one or more spacer discs each including a central opening defined therethrough,
    (C) a semispherical base including a central opening defined therethrough,
    (D) a fastener sized and dimensioned to correspond to the central openings of the base mount disc, the first set of one or more spacer discs, and the semispherical base, and
    (E) wherein the base mount disc, the plurality of spacer discs, and the semispherical base are coupled together by the fastener, which is disposed within the opening in each of the base mount disc, the first set of one or more spacer discs, and the semispherical base, a portion of the fastener proximate one of its ends being threadably received within a threaded receptacle; and
  (c) one or more additional spacer discs;
  (d) wherein the system is configured such that operating the grass trimming apparatus by
    (i) holding the grass trimming apparatus in an operable position,
    (ii) placing the spinning support guide on a first trimmable surface, whereby the spinning support guide provides a point of contact between the grass trimming apparatus and the first trimmable surface, and
    (iii) effecting spinning of the trimming line, results in trimming a portion of the first trimmable surface to a first height;
  (e) wherein the spinning support guide is configured to allow for disassembly of the spinning support guide by removing the fastener so as to decouple the semispherical base from the base mount disc and allow removal of one or more of the first set of one or more spacer discs or insertion of one or more of the one or more additional spacers discs, thereby resulting in use of a second set of one or more spacer discs, the spinning support guide being configured such that, when subsequently reassembled with the second set of one or more spacer discs, operating the grass trimming apparatus by
    (i) holding the grass trimming apparatus in an operable position,
    (ii) placing the spinning support guide on a second trimmable surface, whereby the spinning support guide provides a point of contact between the grass trimming apparatus and the second trimmable surface, and
    (iii) effecting spinning of the trimming line, results in trimming a portion of the second trimmable surface to a second height, and
  (f) wherein the second height differs from the first height based on a difference in height of the first set of one or more spacer discs and the second set of one or more spacer discs.

18. The system of claim 17, wherein each of the spacer discs has a thickness of between three-eighths inch (3/8") and one and five-eighths inches (1 5/8").

19. The system of claim 17, wherein the fastener is configured for use with a hex key.

20. The system of claim 17, wherein the fastener is configured for use with an Allen wrench.

* * * * *